United States Patent [19]
Böttcher et al.

[11] 4,390,745
[45] Jun. 28, 1983

[54] ENCLOSURES FOR ELECTRICAL APPARATUS, CABLE AND ENCLOSURE COMBINATIONS, AND KITS AND METHODS FOR THEIR CONSTRUCTION

[75] Inventors: Bodo K. Böttcher, Zorneding; Manfred O. Wilck, Neubberg, both of Fed. Rep. of Germany

[73] Assignee: Raychem GmbH, Putzbrunn, Fed. Rep. of Germany

[21] Appl. No.: 98,900

[22] Filed: Nov. 30, 1979

[30] Foreign Application Priority Data

Dec. 1, 1978 [GB] United Kingdom ............. 46786/78

[51] Int. Cl.³ .................. H02G 15/064; H02G 15/184
[52] U.S. Cl. .................................. 174/73 R; 156/86; 174/DIG. 8; 428/36
[58] Field of Search .......... 174/73 R, 73 SC, DIG. 8, 174/88 R, 88 C; 428/36; 156/86

[56] References Cited

U.S. PATENT DOCUMENTS

| | | | |
|---|---|---|---|
| 3,317,655 | 5/1967 | Oatess et al. | 174/73 R |
| 3,329,764 | 7/1967 | Tanges, Jr. | 174/DIG. 8 |
| 3,349,164 | 10/1967 | Wyatt | 174/73 |
| 3,382,308 | 5/1968 | Short | 174/73 R X |
| 3,396,231 | 8/1968 | Anderson | 174/73 |
| 3,692,922 | 9/1972 | Sugimoto et al. | 174/73 R |
| 3,717,717 | 2/1973 | Cunningham et al. | 174/73 R |
| 3,777,048 | 12/1973 | Traut | 174/73 R |
| 3,793,475 | 2/1974 | Yonkers | 174/73 R |
| 3,816,639 | 6/1974 | Anderson et al. | 174/73 R |
| 3,816,640 | 6/1974 | Varner | 174/73 R |
| 3,950,604 | 4/1976 | Penneck | 174/73 R X |
| 4,006,286 | 2/1977 | Larsson | 174/73 R |
| 4,045,604 | 8/1977 | Clabburn | 174/73 R X |
| 4,054,743 | 10/1977 | Mayer et al. | 174/73 R X |
| 4,304,616 | 12/1981 | Richardson | 156/86 |

FOREIGN PATENT DOCUMENTS

| | | |
|---|---|---|
| 1490435 | 5/1969 | Fed. Rep. of Germany . |
| 2534385 | 3/1976 | Fed. Rep. of Germany ... 174/DIG. 8 |
| 553964 | 6/1943 | United Kingdom . |
| 1142050 | 2/1969 | United Kingdom . |
| 1246829 | 9/1971 | United Kingdom . |
| 1302626 | 1/1973 | United Kingdom . |
| 1353752 | 5/1974 | United Kingdom ......... 174/DIG. 8 |
| 1399719 | 7/1975 | United Kingdom . |
| 1407119 | 9/1975 | United Kingdom . |
| 1411322 | 10/1975 | United Kingdom . |
| 1434719 | 5/1976 | United Kingdom . |
| 1440524 | 6/1976 | United Kingdom . |
| 1450264 | 9/1976 | United Kingdom . |
| 1470501 | 4/1977 | United Kingdom . |
| 1470502 | 4/1977 | United Kingdom . |
| 1470504 | 4/1977 | United Kingdom . |
| 1526397 | 9/1978 | United Kingdom . |
| 1551748 | 8/1979 | United Kingdom . |

OTHER PUBLICATIONS

"Heat Shrinkable Materials for 11 KV Cable Systems"; Clabburn, Field and Penneck, *The Institution of Electrical Engineers*, 1975.

"Heat-Shrinkable Plastics for Termination and Jointing of Power and Auxiliary Cables;" Ash, Bagdzinski and Clabburn, *Proc. IEE*, vol. 117, No. 7, Jul. 1970, pp. 1365-1372.

*Primary Examiner*—Laramie E. Askin
*Attorney, Agent, or Firm*—Lyon & Lyon

[57] ABSTRACT

Enclosure for electrical apparatus comprising a first hollow sleeve of insulating material around which is positioned a second sleeve comprising an inner layer of insulating material and an outer layer of conductive material (normally connected to earth, e.g. a cable shield). This construction locates the major discontinuities of the material enclosure wall between layers of the insulating materials thus reducing the electrical stresses which could lead to insulation failure. The first sleeve may have an innermost laminated layer of stress grading material. Electrically conducting material may be present on the inner surface of the first sleeve to form a Faraday cage. Further sleeves may be interposed between the first and second sleeves to increase the insulation for higher voltages, and void filling compound may be used further to improve the electrical conditions within the enclosure.

39 Claims, 8 Drawing Figures

ENCLOSURES FOR ELECTRICAL APPARATUS, CABLE AND ENCLOSURE COMBINATIONS, AND KITS AND METHODS FOR THEIR CONSTRUCTION

This invention relates to enclosures for insulating electrical apparatus, to a method of insulating electrical apparatus, and to a kit of parts for use in making enclosures.

When a continuously shielded high voltage cable is spliced or connected to a component, it is frequently necessary that not only should the splice or termination be provided with a layer of insulation having a thickness appropriate to the voltage at which the cable is to be used, but that earth continuity be maintained across the splice or termination and that, where relatively high voltages are concerned, stress control be provided at the end of the cable shield to relieve the electrical stress at that point. There is thus a need, especially where relatively high voltages are concerned, for an enclosure for electrical apparatus, especially a cable termination or splice, that can be manufactured economically and applied with the minimum of time and skill.

According to the present invention there is provided an enclosure suitable for providing earth continuity in electrical apparatus, especially cable terminations and splices, which enclosure comprises first and second hollow articles each having at least one open end, the first hollow article being capable of being positioned about, and of being brought into close conformity with, the electrical apparatus and comprising a hollow electrically insulating component, and the second hollow article being capable of being positioned about, and of being brought into close conformity with, the first hollow article (or a further layer installed thereon) when said first hollow article is installed on the electrical apparatus, the second hollow article comprising a hollow electrically insulating component within and axially substantially aligned with a hollow electrically conductive component.

In another aspect, the invention provides a method for insulating electrical apparatus, especially cable terminations and splices, which comprises positioning about the electrical apparatus a first hollow article having at least one open end and comprising a hollow electrically insulating component and bringing the article into close conformity with the electrical apparatus, positioning about the installed first article, optionally after providing one or more further, preferably insulating, layers about the first article, a second hollow article having at least one open end and comprising a hollow electrically insulating component within and axially substantially aligned with a hollow electrically conductive component, and bringing the second article into close conformity with the first article or the said further layer or the outermost said layer.

Where relatively high voltages are concerned, for example voltages above about 15 kv (and in some cases above about 12 kv) the first article advantageously comprises a hollow stress grading component within the electrically insulating component. Alternatively, some other form of stress control could be used. One way of achieving this would be to taper the insulating layer at one or both ends of one or both of the articles.

It is to be understood that although in the first article the stress grading component (if present) is radially within the electrically insulating component and in the second article the electrically insulating component is radially within the electrically conductive component, the components in each article are not necessarily longitudinally coextensive, and in each article either component may if appropriate extend beyond the other component at one or both ends thereof.

The invention also provides electrical apparatus insulated by an enclosure or method in accordance with the invention.

The present invention makes it possible to provide an enclosure for, for example, a cable termination or splice, in which earth continuity can be maintained and a relatively thick insulating layer, and if desired stress relief, can be provided by the use of two readily installed components without the need to resort to, for example, complex tape winding procedures commonly used in the past for building up individual layers. The fact that a relatively thick insulating layer can be provided (by the use of a first article comprising an outer electrically insulating layer and a second article comprising an inner electrically insulating layer, one or more further electrically insulating layers being installed, if desired, between the two said electrically insulating layers) is particularly advantageous when, for example, terminating or splicing high voltage cable, for example cables operating at 8 kv and above, particularly 12 kv and above. Thus, for example, there is no need for the prolonged heating, with the attendant risk of damage to the parts, that would be required in order to shrink a heat-recoverable insulating layer of the thickness required for, for example, a 15 kv cable.

The invention also has the advantage that it avoids the need for the installer in the field to form interfaces between insulating layers and conductive layers or insulating layers and semi-conductive layers. When such interfaces are formed, for example, when using tape winding procedures to build up individual layers, any voids which are formed between individual layers are adjacent to the conductive or semi-conductive layers, with the risk of discharge activity in the voids leading to deterioration of the insulation. In accordance with the present invention, the interface formed by the installer in the field can be between two insulating layers so that any voids formed are not subject to the same electrical stress as would be the case if they were adjacent to a conductive or semi-conductive layer. Thus it will be noted that in, for example, splices protected in accordance with the invention, there can be interfaces in the dielectric above the connection between the inner conductors.

A further advantage of the invention is that, as two separate insulating layers are used, it is possible to use layers of different dielectric constant, thus, for example, the insulating layer of the first article may have a higher dielectric constant than the insulating layer of the second article. The use of insulating layers of different dielectric constants may make it possible to make better electrical use of the insulation; thus, for example, a more uniform stress across the total insulation may be obtained when would be possible with a single layer of uniform dielectric constant.

The invention also makes it possible to provide enclosures for electrical apparatus, for example cables, of a wide range of voltage classes using only a small set of relatively simple articles.

The hollow articles used in accordance with the invention are preferably open at both ends. The articles may have any desired configuration, and although the following discussion is primarily in terms of tubular articles, which are preferred, any other suitable configuration may be used unless this is clearly inappropriate in the circumstances. Although this is not essential, from a manufacturing point of view at least that portion of the first article comprising the stress grading layer is desirably of substantially uniform cross-section along its length in the stable or fully recovered state, that is to say the ratio of the thicknesses of the layers is advantageously substantially constant along the length of the stress grading layer and the general configuration of the cross-section is substantially unchanged.

Although in the following discussion the invention is described primarily in terms of a two-layer first article having an inner stress-grading layer and an outer electrically insulating layer and a two-layer second article having an inner electrically insulating layer and an outer electrically conductive layer, it will be appreciated that where applicable to a particular situation, one or both of the articles may comprise one or more further layers and/or, for example, a separate electrically insulating component may be installed around the first article after installation thereof and before installation of the second article thereon. Thus, for example, a further lamina, for example an adhesive, may be present between the two essential layers of one or both of the articles, as may be laminae of materials which will carry out a desired function. Furthermore, one or both articles may, for example, comprise one or more other laminae inside or outside the laminae essential to the invention; any additional laminae between the electrically insulating layer of the first article and the electrically insulating layer of the second article may, for example, be electrically insulating, or could for example be conductive or semi-conductive.

Any suitable stress relieving material may be used as the stress grading inner layer of the first article, and the material used may have electrical impedance characteristics which are resistive or capacitative, or a combination of both. Preferably the stress grading layer is semiconductive and comprises a polymeric matrix having dispersed therein a conductive filler, and especially carbon black.

Polymeric materials suitable for use as the polymeric matrix include, for example, resins comprising, for example, polyolefins and olefin copolymers for example polyethylene, polypropylene, ethylene/propylene copolymers, and polybutenes; substituted polyolefins, particularly halogen-substituted polyolefins, for example polyvinyl chloride, polyvinylidene chloride, polyvinylidene fluoride, Teflon 100 (a polytetrafluoroethylene manufactured by Du Pont), Teflon FEP (a copolymer of tetrafluoroethylene and hexafluoro-propylene manufactured by Du Pont), Teflon PFA (a copolymer of tetrafluoroethylene and perfluoroalkoxy moieties manufactured by Du Pont), Tefzel (a terpolymer of ethylene, tetrafluoroethylene and a fluorinated monomer manufactured by Du Pont), and Halar (a copolymer of ethylene and chlorotrifluoroethylene manufactured by Allied Chemicals); polyesters, particularly segmented copolyester polymers, for example Hytrel (a segmented polyether ester copolymer derived from terephthalic acid, polytetramethylene ether glycol and 1,4-butanediol manufactured by Du Pont); and polyurethanes.

Examples of other polymeric materials suitable for use as the polymeric matrix include elastomers comprising, for example, copolymers of dienes with olefinically unsaturated monomers, for example ethylene/propylene/non-conjugated diene terpolymers, styrene/butadienepolymers, butyl rubbers and copolymers of dienes with unsaturated polar monomers, for example acrylonitrile, methyl methacrylate, ethyl acrylate, vinyl pyridine and methyl vinyl ketone; halogen-containing elastomers, for example chloroprene polymers and copolymers, for example neoprene, chlorinated polyethylene, chlorosulphonated polyethylene, and Viton (a copolymer of vinylidene fluoride and hexafluoropropylene manufactured by Du Pont); copolymers of olefins with olefinically unsaturated esters, for example elastomeric ethylene/vinyl acetate polymers, ethylene/acrylic acid ester copolymers for example ethylene/ethyl acrylate and methacrylate copolymers and particularly ethylene/acrylic rubbers, for example Vamac (a terpolymer of ethylene, methyl acrylate and a curesite monomer manufactured by Du Pont); acrylic rubbers, for example polyethyl acrylate, polybutyl acrylate, butyl acrylate/ethyl acrylate copolymers, and butyl acrylate/glycidyl methacrylate copolymers; silicone elastomers, for example polydiorganosiloxanes, copolymers, block copolymers, and terpolymers of monomethylsiloxanes, dimethylsiloxanes, methylvinylsiloxanes and methylphenylsiloxanes, fluorosilicones, for example those derived from 3,3,3-trifluoropropyl siloxane and carborane siloxanes; elastomeric polyurethanes; and polyethers, for example epichlorohydrin rubbers.

Blends of the above-mentioned elastomers and resins may also be used. Particularly good results have been obtained using polyolefins, olefin copolymers and halogen-substituted olefin polymers.

Any suitable carbon black may be used. Examples of suitable carbon blacks that are currently commercially available are types HAF, SRF, EPC, FEF and ECF. The amount of carbon black in the stress grading material will depend to some extent on the type of black used and the polymer matrix, but preferably the material comprises from 5 to 150 parts by weight of carbon black, per 100 parts by weight of polymer.

Alternatively there may be used as the stress grading inner layer a composition having electrical resistive characteristics as described in British Pat. Nos. 1,470,501, 1,470,502, 1,470,503 and 1,470,504, the disclosures of which are incorporated herein by reference. In place of the polymeric materials listed previously, the stress grading inner layer may comprise a fluid coating, for example a mastic or a grease. Examples of suitable materials are given in British Patent Specification No. 1,526,397, the disclosure of which is incorporated herein by reference. The coating does not need to have mechanical strength of itself; all that is required is that the coating stays in position during application and subsequently.

The stress grading inner layer preferably has a high permittivity, usually in excess of 20. This corresponds to a specific impedance close to $10^9$ ohm cm. Preferably the specific impedance lies in the range $10^7$ to $10^{10}$ ohm cm, measured at a frequency of 50 Hz.

The electrically insulating layer of the first article and the electrically insulating layer of the second article preferably comprise a substantially discharge resistant material and desirably, though not essentially, comprise a substantially track resistant, and preferably non-tracking, material. By "non-tracking" there is meant a material which is resistant to the formation of dendritic, carbonaceous, electrically conducting deposits on its surface under the influence of high electrical voltages. The insulating layers may, for example, comprise a polymeric material as listed above, or a mixture of such polymeric materials, and may comprise an anti-tracking filler. Examples of suitable discharge and track resistant materials comprising anti-tracking fillers are described in British Pat. Nos. 1,041,503; 1,240,403; 1,303,432 and 1,337,951, the disclosures of which are incorporated herein by reference. The electrically insulating layers may comprise the same or different materials.

Preferably each of the insulating layers has a dielectric constant of from 2 to 4 and a volume resistivity of at least $10^{10}$, preferably at least $10^{12}$ ohm cm. The two layers may have substantially the same or different properties provided that each is electrically insulating.

The conductive outer layer of the second article may comprise a woven or stranded metal braid or a conductive paint but preferably comprises a polymeric matrix having a conductive filler dispersed therein, or wires embedded therein which may replace the usual external braid. The polymeric matrix may, for example, comprise any of the polymeric materials listed previously, or a mixture of such materials, and the conductive filler may, for example, comprise metal particles or a conductive carbon black. Particularly good results have been achieved using an electrically conductive polymeric composition as described in British Pat. No. 1,294,665, the disclosure of which is incorporated herein by reference. The conductive outer layer preferably comprises from 10 to 70 parts by weight of the conductive filler, based on the total weight of the polymeric matrix and the filler.

The material of the conductive outer layer preferably has a volume resistivity of less than $5 \times 10^4$ ohm cm, and most preferably less than 100 ohm cm.

In general it can be said that the mechanical, thermal and insulating requirements for each of the layers in the two articles should be appropriate to the cable or other electrical apparatus to be protected by the enclosure. Typically, for high voltage cables it is advantageous for the layers to be flexible and suitable for continuous use over a temperature range of at least $-40°$ to $+70°$ C. The preferred materials for the insulating layers are ethyl polymers and copolymers, and elastomers, preferably containing additives to achieve good discharge resistance (see above).

The first and second hollow articles used in accordance with the present invention can be positioned about and brought into close conformity with the electrical apparatus to be protected and the installed first article (or a layer thereon) respectively, and, desirably, but not essentially, the close conformity results in there being substantially no voids between contiguous layers. By close conformity is meant the property of an article to follow closely the contours of an underlying substrate. Such close conformity may be obtained, for example, by the use of articles that are elastomeric or heat-recoverable, or both.

Where the first and/or second article is elastomeric, it may be brought into close conformity with the underlying substrate by simply pushing it onto the substrate, the elasticity of the article enabling it to conform closely to the contours thereof. In another embodiment an elastomeric first or second article may be "held-out" in a stretched state by an inner or outer hold-out member which can be removed or displaced, the elastic stresses released thereby urging the article to recover into conformity with the substrate apparatus. Thus, for example, a relatively rigid spirally wound core could be progressively unwound, thus allowing an elastomeric article positioned over the core to recover in conformity with the substrate. In a still further embodiment the article may be bonded to the hold-out member and the bond weakened, for example by solvent or mechanical treatment, to permit recovery.

Preferably, however, at least one of the hollow articles is heat-recoverable, and, advantageously, both hollow articles are heat-recoverable. Usually, such articles recover, on heating, towards an original shape from which they have previously been deformed, but the term "heat-recoverable" as used herein also includes any article which on heating adopts a new configuration, even if it has not previously been deformed. In their most common form, heat-recoverable articles comprise a polymeric material exhibiting the property of elastic or plastic memory as described for example, in U.S. Pat. Nos. 2,027,962, 3,086,242 and 3,957,382. In other articles, as described, for example in British Pat. Nos. 1,434,719 and 1,440,524, an elastomeric member is held in a stretched state by a second member, which upon heating, weakens and thus allows the elastomeric member to recover. The disclosures of these Specifications are incorporated herein by reference. Where either or both of the articles is or are heat-recoverable, the stress grading layer of the first article, the insulating layer of the first article, the insulating layer of the second article, and the conductive layer of the second article may each be independently heat-recoverable, or one or more of the layers may be elastomeric, provided that the article(s) as a whole is or are heat-recoverable. It may in some cases be desirable for the second article to comprise an elastomeric electrically insulating layer "held out" by an electrically conductive layer that weakens on heating; in this case a relatively thick insulating layer may be provided in the second article without the need for a proportionately long heating time for effecting recovery.

The stress-grading component (if present) of the first article may if desired be a continuous layer extending from one end to the other of the article and a first article having such a stress-grading layer has the advantage (see below) that it can be manufactured by coextrusion of the layers. In other embodiments, however, the stress grading layer may extend over only part of the length of the first article provided that in use it can provide the necessary stress relief.

The invention also comprehends the use of a tapered portion of the insulating layer(s) to produce a stress cone adjacent to the or each cable shield end. This tapered portion preferably does not extend beyond the end of the cable shield, and it has been found to be surprisingly advantageous to space the tapered portion longitudinally from the end of the shield, thus producing smoother stress grading than in the case where the tapered portion ends at the shield end. Thus, for example, in the case of shielded high voltage cable, the stress grading must extend for a sufficient distance over the dielectric from the end of the shield to provide the necessary stress control at the end of the shield.

In one embodiment wherein the stress grading layer extends over only part of the length of the first article, the stress grading layer is substantially centrally disposed along the length of the first article, and in this case, the stress grading layer preferably extends for at least 60% of the length of the article and most preferably for at least 75% of its length.

In a second embodiment wherein the stress grading layer extends over only part of the length of the first article, at least one portion of the inner wall of the first article is electrically conductive. In use such an electrically conductive portion may be positioned around, for example, a splice between the central conductors of two cables or the connection of a cable conductor to an electrical component to provide improved electrical characteristics in the splice or connection. In a particularly preferred arrangement, the inner surface of the first article comprises an electrically conductive layer centrally disposed along the length of the article and a stress grading layer on each side of the electrically conductive layer, which stress grading layers may or may not extend to the ends of the article. For some purposes, it is advantageous to provide electrically conductive layers at the ends of the article as a means of establishing earth contact, in which case the inner surface of the preferred arrangement just mentioned comprises an electrically conductive layer disposed between the two stress grading portions, all three being between the end conductive layers.

In some cases, although not for example when the stress grading layer has non-linear characteristics, it is advantageous for the stress grading layers in this arrangement to contact the conductive layer. When the article is to be used for protecting, for example, the termination of a cable to an electrical component, one of the stress grading layers may be omitted. The invention also provides a first article in accordance with the invention when the inner wall of the article is substantially without steps and comprises at least one stress grading portion and at least one electrically conductive portion.

Where the use of an electrically conductive layer round, for example, a cable splice is desirable, this may, of course, be a conductive layer applied, for example painted, on a continuous stress-grading layer. Alternatively, for example, a conductive layer could be installed round the splice before the installation of the first article thereon, or the article comprising the stress grading layer and the insulating layer may be partially recovered round a conductive insert to form a recoverable article which can substantially be recovered around, for example, a splice.

Whether or not an electrically conductive inner layer is used, it may in some circumstance be found to be advantageous to provide the space adjacent to the exposed electrical conductor, for example the region surrounding the crimped central conductors of a cable splice, with a void-filling material. Such a material may be a grease, for example a silicone grease, a mastic, or a hot melt adhesive. A particularly suitable void-filling material is described in German Offenlegungsschrift No. 2,748,371, the disclosure of which is incorporated herein by reference. A substance which acts, for example as an adhesive sealant, or void filling material may also be used, for example, between the first and second articles. Thus, for example, such a substance may be provided on at least part of the interior of the second article and/or at least of the exterior of the first article.

At least the second article of the present invention can be formed so as to have a substantially uniform cross-section along its length, at least in the stable or freely recovered state, if the articles are recoverable, thus enabling the article to be produced by relatively inexpensive extrusion methods. This is a considerable advantage over prior art designs which frequently require sophisticated moulding operations. Where the stress grading layer extends along the entire length of the inner article, this article may also be extruded. Other methods, for example moulding or casting, could of course be used for either of the articles. However, the preferred method production, where this is possible, is by extrusion of each of the articles, followed if necessary by treatment to render the products recoverable. This treatment may involve, for example, crosslinking by ionising radiation or by chemical crosslinking agents, followed by expansion, for example, using differential gas pressure or a mandrel. Each of the articles could also, of course, be built up from the individual layers, the layers being bonded together if necessary. Examples of suitable adhesives are given in British Specification Nos. 1,434,719 and 1,440,524.

The dimensions of the articles used according to the invention will of course vary depending on the application, and the relative thicknesses of the various layers in the two articles will be dictated to some extent by the required electrical properties of the enclosure, but examples of suitable dimensions are from 0.5 to 4.0 mm, preferably 1.0 to 3.0 mm, for the stress grading layer, from 0.5 to 6.0 mm, preferably 1.0 to 3.0 mm, for the insulating layer of the first article, from 1.0 to 20.0 mm, preferably 3.0 to 10.0 mm, for the insulating layer of the second article, and from 0.5 to 4.0 mm, preferably 1.0 to 3.0 mm, for the conductive layer. Typical dimensions for an enclosure for a 12 kv splice are 2 mm for the stress grading layer and for the inner insulating layer, 4 mm for the outer insulating layer and 1 mm for the conductive layer, while typical dimensions for a 24 kv splice are 2 mm for the stress grading layer and the inner layer, 8 mm for the outer insulating layer and 1 mm for the outer conductive layer.

Where, for example, the enclosure of the invention is installed on a shielded component, for example, a shielded high voltage cable, the stress grading layer (if present) of the first article and the conductive layer of the second article are required to be in electrical contact with the shield (and thus with each other) at least after the enclosure is installed on the cable, and this may be achieved by an appropriate configuration of the ends of the enclosure or by the provision of means for making electrical contact between the layers, a common connection being made to the shield. Electrical contact between the stress grading layer and the shield and the conductive layer and the shield may be direct or indirect.

In one sample form, for example, the ends of the enclosure may be profiled so that, on engagement, both the conductive layer and the stress grading layer contact the cable shield, and indirect electrical contact between these two layers is thereby made through the shield. Alternatively, the ends of the enclosure may be so arranged that the insulating intermediate layers terminate just before the stress grading layer and electrically conductive layer thus allowing them to come into direct electrical contact, a common connection then being made to the shield; if the stress grading layer is interposed between the shield and the conducting layer, the voltage drop across this layer should in general be negligible and preferably a separate low resistance connection (for example by means of a conductive strap or braid as described below) should be made. Another possibility is that indirect electrical contact may be provided by conductive members which fit on the ends of the enclosure. Such members can, for example, be metal straps or braids or moulded parts formed from conductive polymeric materials, which may, if desired, be heat-recoverable.

The moulded parts may, for example, be annular members which have grooved faces and can fit over the ends of the enclosure, and may advantageously be provided with an internal coating of a sealant, for example a mastic or hot melt adhesive, to give environmental protection to the ends of the enclosure. The internal coating of sealant should either be conductive, or arranged in such a way that the conductive moulded part can provide the required electrical continuity.

The enclosures of the invention are particularly suitable for protecting terminations and splices in high voltage power cables, for example those operating at voltages in excess of 8 kv and especially in excess of 12 kv.

Various embodiments of the invention will now be described, by way of example only, with reference to the accompanying drawings, in which.

The figures are not drawn to scale.

Figure 1:
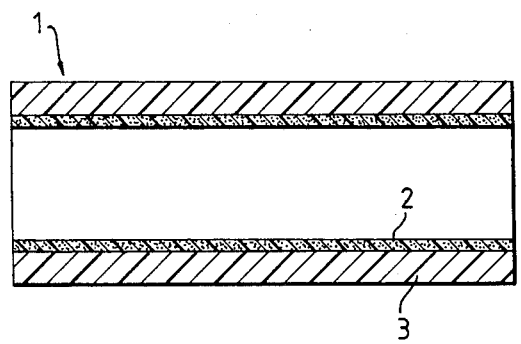
FIGS. 1 and 2 are axial sections through two different first articles suitable for use in accordance with the invention.

Referring now to the drawings, FIG. 1 shows a tube indicated generally by the reference numeral 1 suitable for use as a first article in accordance with the invention. The tube 1 comprises an inner layer 2 of stress grading material and an outer layer 3 of electrically insulating material. In this embodiment, the stress grading layer 2 extends for the whole length of the tube 1.

Figure 2:
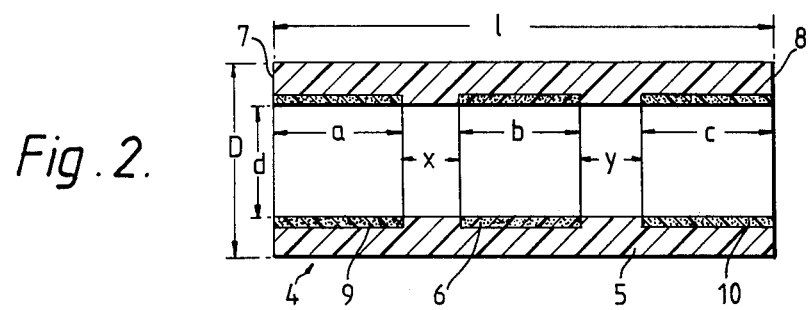

In the embodiment shown in FIG. 2, however, a tube generally indicated by the reference numeral 4 comprises an electrically insulating outer layer 5 and, on the inner surface of the layer 5, an electrically conductive layer 6 which is centrally situated along the length of the tube 4 and does not extend to the open ends 7 and 8 of the tube 4. Each of two stress grading layers, 9 and 10 respectively, extends from a respective open end of the tube 4 towards the electrically conductive layer 6. Advantageously, unless the stress grading layer has nonlinear characteristics, each of the stress grading layers 9 and 10 touches the electrically conductive layer 6 (i.e. the distances x and y in FIG. 2 are advantageously zero). It will be noted that the inner wall of the tube 4 is smooth and without steps which could lead to undesired voids in the final structure.

Figure 3:
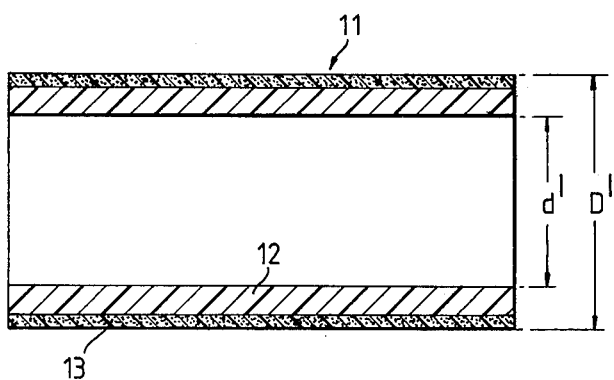
FIG. 3 is a longitudinal section through a second article suitable for use in accordance with the invention.

FIG. 3 shows a tube generally indicated by the reference numeral 11 suitable for use as a second article in accordance with the invention. The tube 11 comprises an inner electrically insulating layer 12 and an outer electrically conductive layer 13.

Figure 4:
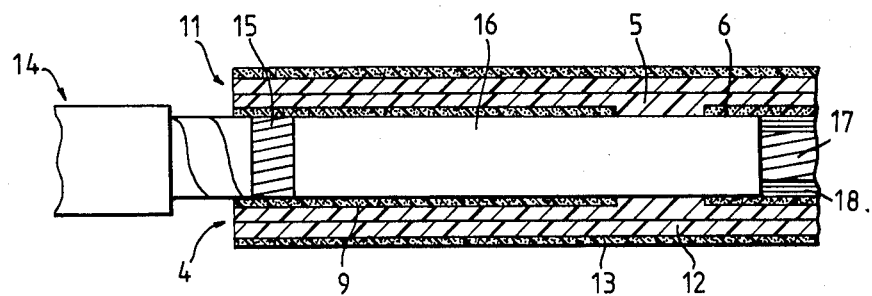
FIG. 4 is a longitudinal section through one half of a splice protected in accordance with the invention.

FIG. 4 shows one half of a cable splice having an enclosure made using the first article (inner tube) of FIG. 2 and the second article (outer tube) of FIG. 3; the right hand side of the splice (not shown) may be substantially identical to the left hand side.

When making the protected splice of FIG. 4, an end of a high voltage cable generally indicated by the reference numeral 14 is stripped to expose a length of the shield 15, a length of the dielectric 16 and a length of the centre conductor 17. A crimp sleeve 18 may then be installed over the exposed centre conductor 17 and the exposed centre conductor of the cable (not shown) to which a splice is to be made, and crimped to provide the desired electrical connection. A heat-shrinkable inner tube 4, which has previously been slipped over one of the cables is then positioned around the splice and heated so that it recovers into contact with the splice. As can be seen from FIG. 4, the inner tube 4 is so designed and positioned that the electrically conductive layer 6 recovers round the crimp connection and the adjacent end of the exposed dielectric 16 of each of the cables, while the stress grading layers 9 and 10 (of which only layer 9 is shown in FIG. 4), recovers round the exposed portion of the cable shield 15 and the adjacent end of the cable dielectric 16.

To complete the enclosure around the splice, a heat-shrinkable outer tube 11 which has previously been slipped over one of the cables is then positioned around the shrunk inner tube 4 and is heated to cause it to recover into contact with the inner tube 4, the arrangement being such that there is electrical contact between the outer electrically conductive layer 13 of the tube 11 and the exposed cable shield 15. If desired an electrically insulating void filling substance, for example a grease, (not shown) may be present on the exterior of the tube 4 and/or the interior of the tube 11 to ensure that there are no voids between the tubes after recovery thereof. A further electrically insulating tube (not shown) may also, if desired, be positioned between inner tube 4 and outer tube 11, for example by shrinking of a suitable heat-shrinkable tube around the inner tube 4 after installation thereof and an electrical connection between the outer conductive layer 13 and the cable shield 15 is made by means of a metal strap or braid (not shown in FIG. 4).

As can be seen from FIG. 4, the invention makes it possible to provide a relatively thick insulating layer using heat-shrinkable parts which, because they themselves are not of extreme thickness, can be shrunk in an acceptable time and without the danger of charring that accompanies the lengthy heating required to shrink a relatively thick electrically insulating heat-shrinkable layer.

Figure 5:
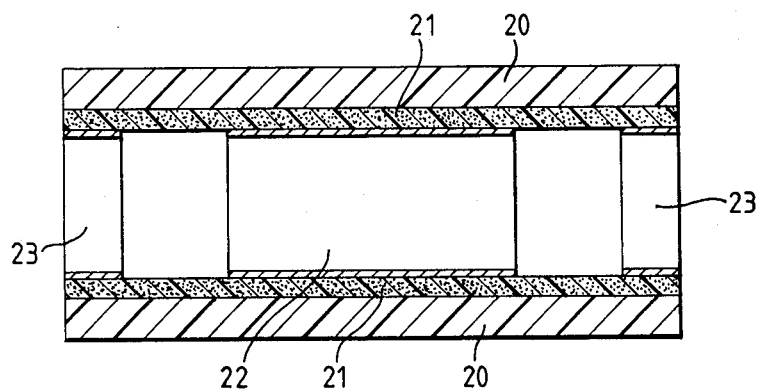
FIG. 5 is a longitudinal section through a sleeve of electrically insulating material.

FIG. 5 is a longitudinal section through a sleeve of electrically insulating material 20 having an inner lining of stress grading material 21, and innermost layers of electrically conducting material 22 and 23 at its central and end portions. Such a sleeve is suitable for use as the first article in some embodiments of the present invention. The end conductive layers 23 are optional.

Figure 6:
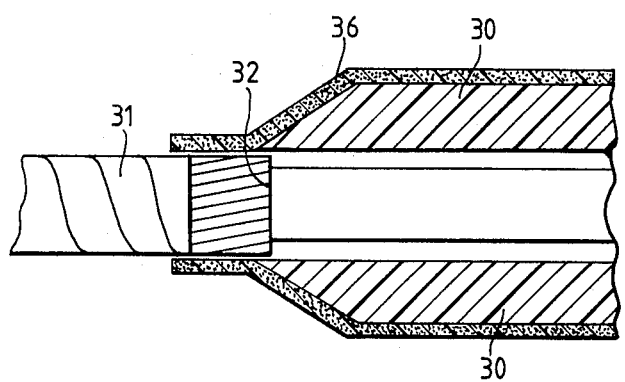
FIGS. 6 and 8 show schematically the tapering of an electrically insulating layer to form a stress cone suitable for use in the second article according to the present invention.

FIG. 6 illustrates the tapering of the insulating layer 30 of an article suitable for use as the second article of the present invention, in the form where the conductive layer 36 makes electrical contact with the cable shield 31 at a distance from the end 32 of the shield substantially equal to the thickness of the insulating layer overlying the shield ends. This arrangement in itself is described and claimed in the copending U.S. application Ser. No. 74,336 filed Sept. 11, 1979.

Figure 7:
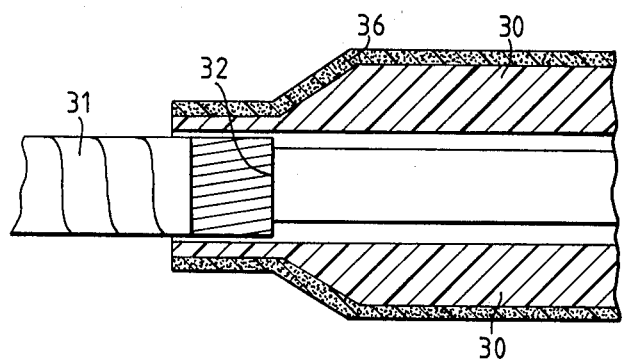

FIG. 7 illustrates the ending of the tapered stress cone at the end 32 of the cable shield, without direct contact between the conductive layer 36 and the shield 31.

Figure 8:
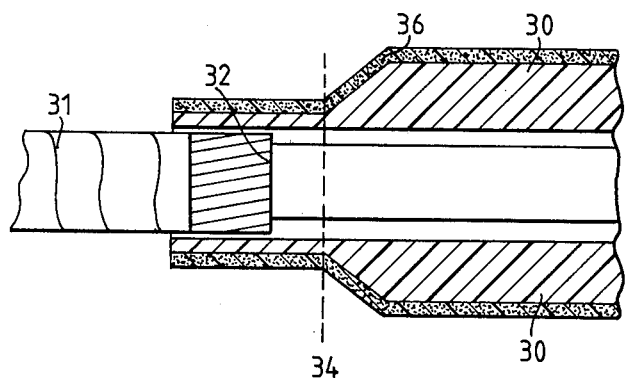

FIG. 8 illustrates the preferred arrangement wherein the stress cone ends at a position 34 which is longitudinally spaced from the cable shield, this arrangement producing improved stress grading as already mentioned.

The following Examples illustrate the invention:

EXAMPLES 1 TO 4

In order to provide splices between 24 kv cables with enclosures in accordance with the invention, inner and outer tubes (which had the structures shown in FIGS. 2 and 3 respectively and the dimensions specified below) were made, the dimensions, which for the inner and outer tubes, are fully recovered dimensions, being mm unless otherwise specified:

| Example | Cable sizes for which suitable (given as cross-sectional area of cable conductor in mm²). | inner tube | | | | | | outer tube | |
|---|---|---|---|---|---|---|---|---|---|
| | | 1 | a | b | c | d | D | d' | D' |
| 1 | 16–70 | 460 | 150 | 160 | 150 | 13 | 28 | 24 | 39 |
| 2 | 95–185 | 500 | 150 | 200 | 150 | 19 | 34 | 30 | 45 |
| 3 | 240–300 | 530 | 150 | 220 | 150 | 24 | 39 | 35 | 50 |
| 4 | 400–800 | 750 | 150 | 440 | 150 | 29 | 44 | 40 | 55 |

The inner tube in each case was moulded, the insulating layer 5 comprising modified polyolefin, the electrically conductive layer 6 (thickness approximately 2 mm) comprising carbon black filled polyolefin and the stress grading layers 9 and 10 (layer thickness approximately 2 mm) comprising semi-conductive modified polyolefin. The outer tubes were coextruded, with the inner electrically insulating layer 12 comprising modified polyolefin and the outer electrically conductive layer 13 (layer thickness approximately 2 mm) comprising carbon black filled polyolefin. The tubes were then heated and expanded radially to approximately twice their original diameter and cooled in the expanded state. The heat-recoverable tubes so produced were then installed by the method described in connection with FIG. 4 and average life tests were carried out on the protected splices. The results obtained demonstrated that excellent electrical results could be obtained using an enclosure in accordance with the invention.

EXAMPLE 5

An enclosure according to Example 2 was converted to a heat-shrinkable form and installed on a splice between two 24 kv cables. The splice was subjected to 40 kv/AC for 1,000 hours and voltage was afterwards increased by 5 kv/500 hour steps. The splice passed 1,000 hours at 40 kv, 500 hours at 45 kv and after 300 hours at 50 kv no breakdown had occurred. The splice withstood 10 shots of 150 kv impulse and also withstood 30 minutes DC at a 100 kv.

Combinations of elements according to the present invention which may prove useful at various voltages include the hollow second article according to the invention (laminate of electrically insulating material inside electrically conducting material) surrounding a hollow first article comprising:

for 12–15 kv (a) a single separate layer of electrically insulating material, optionally with void filler;

(b) same as (a) with additional separate layer of stress grading material inside the separate layer of insulating material;

(c) a laminate of a layer of stress grading material within and substantially axially aligned with an outer layer of electrically insulating material;

for 24–25 kv (d) same as (c) with addition of void filler;

(e) same as (c) with addition of electrically conducting layer at least on a central portion of the innermost surface of the stress grading material;

for 36 kv (f) same as (e);

(g) same as (e) with insulation in the said second article shaped to provide stress cone(s);

(h) same as (e) with addition of further article (c) between (e) and the said second article;

(i) same as (e) with addition of further article (e) between first (e) and the said second article.

We claim:

1. A recoverable enclosure containing a shielded electric cable, wherein said cable comprises: a conductor, dielectric means surrounding said conductor, and shielding means surrounding said dielectric means, the dielectric means being cut back to expose a length of the conductor and the shielding means being cut back to expose a length of the dielectric means; and wherein said enclosure comprises: a first tubular recoverable article having an inner component of stress-grading material, said stress-grading material carrying a layer of electrically conductive material on its innermost surface, and an outer component of electrically insulating material; and a second tubular recoverable article having an inner component of electrically insulating material and an outer component of electrically conducting material; said first article being recovered into close conformity around said cable such that the inner stress-grading component of said first article is in electrical connection with said shielding means of the cable and extends over the dielectric means of the cable, and said second article being recovered around said first article such that said insulating components of both articles are in close conformity with each other.

2. An assembly according to claim 1, wherein at least one of said first and second articles is made of heat-recoverable material.

3. An assembly according to claim 1, wherein the components of at least one of said articles are integral with each other.

4. An assembly according to claim 2 or claim 3, wherein the components of at least one of said articles are co-extruded.

5. An assembly according to claim 1, wherein the electrically insulating component of the second article is immediately adjacent to the electrically insulating component of the first article.

6. An assembly according to claim 1, wherein the stress grading material carries the said layer of electrically conductive material on a part of its innermost surface which is spaced from the ends thereof, and carries a further separate layer of electrically conductive material at at least one of said ends.

7. An assembly according to claim 1, wherein the insulating component of the first article has a dielectric constant which is different from the dielectric constant of the insulating component of the second article.

8. An assembly according to claim 1, wherein the electrically insulating component of said first article and the electrically insulating component of said second article are bonded together through an immediately adjacent electrically insulating layer.

9. An assembly according to claim 1, wherein said stress-grading component extends from said shielding means towards the cable conductor in close conformity with said dielectric means of said cable.

10. An assembly according to claim 1, containing two shielded electric cables, spliced together, wherein said stress-grading component is electrically connected to the shielding means of each of said cables and extends over the splice of said cables in close conformity therewith.

11. An assembly according to claim 10, wherein the components of at least one of said articles are co-extruded.

12. An assembly according to claim 10 or claim 11, wherein at least one of said articles is made of heat-recoverable material.

13. An assembly according to claim 1, wherein at least the stress-grading material and the electrically insulating material of the first article are co-extruded.

14. An assembly according to claim 13, wherein at least one of said first and second articles is made of heat-recoverable material.

15. An assembly according to claim 1, wherein said layer of electrically conductive material comprises at least two portions spaced apart laterally of each other along said first tubular article.

16. A recoverable enclosure containing a shielded electric cable, wherein said cable comprises: a conductor, dielectric means surrounding said conductor, and shielding means surrounding said dielectric means, the dielectric means being cut back to expose a length of the conductor and the shielding means being cut back to expose a length of the dielectric means; and wherein said enclosure comprises: a first tubular recoverable article having an outer component of electrically insulating material, a first inner component of stress-grading material, and a second inner component of electrically conductive material, said first and second components being located substantially laterally of each other; and a second tubular recoverable article having an inner component of electrically insulating material and an outer component of electrically conducting material; said first article being recovered into close conformity around said cable such that the inner stress-grading component of said first article is in electrical connection with said shielding means of the cable and extends over the dielectric means of the cable, and said second article being recovered around said first article such that said insulating components of both articles are in close conformity with each other.

17. An assembly according to claim 16, wherein said first inner component of the first article comprises two portions that are disposed laterally on respective sides of said second inner component of electrically conductive material and wherein said first component portions are separated from said second inner component by inward extensions of said outer component of the first article.

18. An assembly according to claim 1 or 16, which includes a void filler material to reduce the occurrence of voids within the enclosure.

19. An assembly according to claim 1 or claim 16, comprising at least one further layer of electrically insulating material positioned between, and in close conformity with, said first and second articles.

20. An assembly according to claim 1 or 16, wherein at least one of said articles is of substantially uniform cross-section along its length.

21. An assembly according to claim 1, wherein at least the insulating component of the said second article is shaped to provide a stress cone at at least one end of the enclosure.

22. An assembly according to claim 16 wherein at least the insulating component of said second article is shaped to provide a stress cone at at least one end of the enclosure.

23. An assembly according to claim 21 or 22, wherein the narrower end of at least one stress cone is longitudinally spaced from said shielding means so as to enhance the stress grading effect.

24. An assembly according to claim 21 or 22, wherein the narrower end of at least one stress cone is located substantially at the end of said shielding means.

25. An assembly according to claim 21 or 22, wherein at least the insulating component of said second article is shaped to have a first portion of substantially uniform thickness at at least one end, and a second portion, axially contiguous with said first portion, of gradually increasing thickness that forms said stress cone.

26. A kit of parts for use in preparing an enclosure for electrical apparatus comprising first and second hollow articles each having at least one open end, the first hollow article being capable of being positioned about and of being brought into close conformity with the electrical apparatus and comprising a hollow stress grading component within and substantially axially aligned with a hollow electrically insulating component integral therewith, the stress grading component carrying a layer of electrically conductive material on its innermost surface, and the second hollow article being capable of being positioned about and of being brought into close conformity with the first hollow article, when said first hollow article is installed on the electrical apparatus, the second hollow article comprising a hollow electrically insulating component within and substantially axially aligned with a hollow electrically conductive component.

27. A kit of parts according to claim 26, wherein the first article further comprises at least one further layer installed over said electrically insulating component.

28. A kit of parts according to claim 26, wherein said stress grading component of said first article carries said layer of electrically conducting material on a part of its innermost surface which is spaced from the ends thereof, and carries a further separate layer of electrically conductive material at at least one of said ends.

29. A kit of parts for use in preparing an enclosure for electrical apparatus, comprising first and second hollow articles each having at least one open end, the first hollow article being capable of being positioned about and of being brought into close conformity with the electrical apparatus and comprising an outer component of electrically insulating material, a first inner component of stress grading material and a second inner component of electrically conductive material, said first and second components being located substantially laterally of each other, and the second hollow article being capable of being positioned about and of being brought into close conformity with the first hollow article, when said first hollow article is installed on the electrical apparatus, the second hollow article comprising a hollow electrically insulating component within and substantially axially aligned with a hollow electrically conductive component.

30. A kit of parts according to claim 26 or 29, wherein at least one of said first and second articles is made of heat-recoverable material.

31. A kit of parts according to claim 26 or 29, wherein the insulating component of the first article has a dielectric constant which is different from the dielectric constant of the insulating component of the second article.

32. A kit of parts according to claim 26 or 29, wherein at least the insulating component of said second article is shaped to provide a stress cone at at least one end of said article.

33. A kit of parts according to claim 26 or 29, wherein at least the insulating component of said second article is shaped to have a first portion of substantially uniform thickness at at least one end, and a second portion, axially contiguous with said first portion, of gradually increasing thickness to form a stress cone.

34. A kit of parts according to claim 26 or 29, wherein the components of at least one of said articles are integral with each other.

35. A kit of parts according to claim 26 or 29, wherein the components of at least one of said articles are coextruded.

36. A method of enclosing at least one shielded electrical cable which comprises positioning about each said electrical cable a first tubular article comprising an electrically insulating outer component and an inner component of stress grading material integral therewith, said stress grading material carrying a layer of electrically conductive material on its innermost surface, bringing the article into close conformity with each said electrical cable, positioning about the installed first article a second tubular article comprising a hollow electrically insulating component within and substantially axially aligned with an electrically conductive component, and bringing the second article into close conformity with the first article.

37. A method according to claim 36, wherein at least one of said articles is so positioned by recovery of the article towards an original configuration thereof.

38. A method according to claim 36, wherein at least one of said articles is so positioned by being recovered by heat towards an original configuration thereof.

39. A method of enclosing at least one shielded electrical cable which comprises positioning about each said electrical cable a first tubular article comprising an electrically insulating outer component and an inner component of stress-grading material integral therewith and carrying a layer of electrically conductive material on its innermost surface, bringing the article into close conformity with each said electrical cable, positioning at least one further layer about the installed first article and bringing each said further layer into close conformity with the first article as it has been augmented by each preceding further layer and positioning about the outermost further layer a second tubular article comprising a hollow electrically insulating component within and substantially axially aligned with an electrically conductive component, and bringing the second article into close conformity with said outermost layer.

* * * * *